US012644231B2

(12) United States Patent
Turner et al.

(10) Patent No.: US 12,644,231 B2
(45) Date of Patent: Jun. 2, 2026

(54) MOULD FOR FORMING A UNITARY ARTICLE FROM PULP

(71) Applicant: Diageo Great Britain Limited, London (GB)

(72) Inventors: Adam Richard Turner, Toft (GB); Natasha Wilson, Toft (GB); Joshua Lanzon-Miller, Toft (GB); Jonathan Morris, Toft (GB)

(73) Assignee: DIAGEO GREAT BRITAIN LIMITED, London (GB)

( * ) Notice: Subject to any disclaimer, the term of this patent is extended or adjusted under 35 U.S.C. 154(b) by 213 days.

(21) Appl. No.: 18/033,238

(22) PCT Filed: Nov. 4, 2021

(86) PCT No.: PCT/GB2021/052864
§ 371 (c)(1),
(2) Date: Apr. 21, 2023

(87) PCT Pub. No.: WO2022/096888
PCT Pub. Date: May 12, 2022

(65) Prior Publication Data
US 2023/0340733 A1    Oct. 26, 2023

(30) Foreign Application Priority Data

Nov. 4, 2020    (GB) ................................. 202017432
Dec. 8, 2020    (GB) ................................. 202019305

(51) Int. Cl.
*D21J 7/00*        (2006.01)
*B29C 33/38*       (2006.01)

(52) U.S. Cl.
CPC ............ *D21J 7/00* (2013.01); *B29C 33/3814* (2013.01)

(58) Field of Classification Search
CPC ........ D21J 7/00; D21J 1/04; D21J 3/00; D21J 3/10; B29C 33/3814
See application file for complete search history.

(56) References Cited

U.S. PATENT DOCUMENTS 5,190,094 A    3/1993  Knoess
5,399,243 A    3/1995  Miyamoto et al.
(Continued)

FOREIGN PATENT DOCUMENTS

CN      210916808           7/2020
CN      210916808 U    *   7/2020
(Continued)

OTHER PUBLICATIONS

Sabit Adanur, "Paper Machine Clothing," AstenJohnson, second edition, pp. 17-19. (Year: 1997).*
(Continued)

*Primary Examiner* — Jose A Fortuna
(74) *Attorney, Agent, or Firm* — Stephen T. Scherrer; Monique A. Morneault; Scherrer Patent & Trademark Law, P.C.

(57) ABSTRACT

A mould (14) for forming an article from a fibre suspension. The mould includes an insert with a cavity (27) in the negative shape of an article to be formed and two regions of different porosity/permeability (28, 29) about the cavity (27). In use the mould communicates a suspending fluid of the fibre suspension, e.g. by vacuum pump, through the at least two regions of different porosity/permeability about the cavity. A formed shape (22) of fibres is left behind on the cavity.

13 Claims, 5 Drawing Sheets

(56) References Cited

U.S. PATENT DOCUMENTS

| | | | | |
|---|---|---|---|---|
| 6,015,518 A * | 1/2000 | Hirzel | | B28B 7/344 |
| | | | | 264/122 |
| 6,468,398 B1 | 10/2002 | Kumamoto et al. | | |
| 8,246,784 B2 * | 8/2012 | Nilsson | | D21J 3/00 |
| | | | | 162/226 |
| 11,365,518 B2 * | 6/2022 | Hardacre | | D21J 3/10 |
| 11,391,001 B2 * | 7/2022 | Andersson | | B22F 5/007 |
| 12,195,923 B2 * | 1/2025 | Pierce | | D21J 3/00 |
| 2010/0207300 A1 | 8/2010 | Johnson | | |
| 2011/0168346 A1 * | 7/2011 | Nilsson | | D21J 3/00 |
| | | | | 162/382 |
| 2016/0168800 A1 * | 6/2016 | Kuo | | C22C 1/08 |
| | | | | 162/382 |
| 2020/0262599 A1 * | 8/2020 | Appel | | B65B 1/04 |
| 2022/0049432 A1 * | 2/2022 | Pierce | | D21J 3/10 |
| 2022/0288888 A1 * | 9/2022 | Appleford | | B32B 29/005 |
| 2022/0403604 A1 * | 12/2022 | Andersson | | D21J 5/00 |
| 2023/0340733 A1 * | 10/2023 | Turner | | D21J 7/00 |
| 2023/0392322 A1 * | 12/2023 | Pierce | | D21J 7/00 |
| 2024/0200274 A1 * | 6/2024 | Dalton | | B65D 13/00 |
| 2025/0012016 A1 * | 1/2025 | Ashcroft | | D21J 7/00 |

FOREIGN PATENT DOCUMENTS

| | | | | | |
|---|---|---|---|---|---|
| CN | 119110863 A | * | 12/2024 | | D21J 7/00 |
| DE | 102005038887 | | 3/2007 | | |
| DE | 102008008968 | | 8/2009 | | |
| EP | 0440874 | | 8/1991 | | |
| EP | 1195466 | | 4/2002 | | |
| EP | 1195466 A1 | * | 4/2002 | | D21J 3/10 |
| EP | 1288369 | | 3/2003 | | |
| EP | 1081285 | | 2/2006 | | |
| EP | 1081285 B1 | * | 6/2008 | | B65D 1/10 |
| EP | 1288369 B1 | * | 10/2009 | | D21J 3/10 |
| EP | 2198088 | | 7/2019 | | |
| EP | 3708709 | | 9/2020 | | |
| EP | 4497871 A2 | * | 1/2025 | | B29C 33/3814 |
| FI | 4240908 T3 | * | 11/2024 | | D21J 7/00 |
| GB | 2600780 A | * | 5/2022 | | B29C 33/3814 |
| GB | 2614773 A | * | 7/2023 | | B29C 33/3814 |
| GB | 2628131 A | * | 9/2024 | | B29C 31/008 |
| JP | H11-342550 | | 12/1999 | | |
| JP | 2001-140199 | | 5/2001 | | |
| JP | 2018-501415 | | 1/2018 | | |
| JP | 2025063084 A | * | 4/2025 | | B29C 33/3814 |
| KR | 20020028926 | | 4/2002 | | |
| SE | 2230069 A1 | * | 9/2023 | | D21J 5/00 |
| VN | 10052725 B | * | 10/2025 | | |
| WO | 0168984 | | 9/2001 | | |
| WO | 2006057610 | | 6/2006 | | |
| WO | 2009034344 | | 3/2009 | | |
| WO | 2018020219 | | 2/2018 | | |
| WO | 2020141208 | | 7/2020 | | |
| WO | WO-2024144980 A2 | * | 7/2024 | | D21H 11/02 |
| WO | WO-2024189318 A1 | * | 9/2024 | | B29C 31/008 |

OTHER PUBLICATIONS

UKIPO Examination Reports for corresponding priority applications.

IPRP.

English translation of report in corresponding Korean application.

Corresponding report from corresponding Israeli application.

* cited by examiner

SECTION A-A

MOULD FOR FORMING A UNITARY ARTICLE FROM PULP

TECHNICAL FIELD

The present invention relates to a mould for use in a system for forming a moulded article. Particularly, the invention is concerned with forming containers from a fibre suspension, e.g. paper pulp. The articles/containers may be a consumer packaging useful for holding liquids.

BACKGROUND TO THE INVENTION

It is desirable to reduce plastics use in consumable items, particularly packaging. Trays and simple shapes are commonly made from paper pulp, but more complex three-dimensional forms, such as bottles required to hold liquids, are more difficult to engineer.

Published patent documents EP1081285A1, EP1195466A1, EP2198088A1 and WO2018020219A1 each describe forming an article from paper pulp in a mould. The mould features a negative image/impression of the article and has openings through it or is porous such that a suspending liquid introduced to the mould, with which the pulp is mixed, can be removed by applying suction. The pulp left behind after the liquid is removed conforms to the shape of mould. In a second step an inflatable member in a collapsed state is introduced into the mould and inflated to apply pressure against the internal walls of the article being formed, thereby distributing pulp to a more uniform wall thickness and expelling further suspending liquid from the article and mould. The formed article is released from the mould and dried to remove remaining liquid.

SUMMARY OF THE INVENTION

The present invention is concerned with an evolution of the above-described technology to improve the specifications of the resultant article being formed or at least provide the public with an alternative. The invention is particularly suited to producing bottles for holding liquids such as cleaning products and beverages.

In a broad aspect implementing the invention a mould structure is defined according to claim 1. A corresponding system and method according to the invention is defined at claim 13. Other useful features are outlined in dependent claims. An aspect of the invention may also extend to a combination of a mould structure and a particular pulp slurry mixture.

It is envisaged that the invention will ultimately produce an improved pulp bottle construction, made in one piece. Accordingly, a novel bottle obtainable by the process is also envisaged. The process herein is primarily intended for forming a bottle shaped article, which also encompasses a jar or similarly shaped lid closable container.

The mould of the invention features a substantive volume with at least two zones of porosity (e.g. and/or zones of variable permeability). For example, a first porous (or permeable) zone located at an article facing surface of the mould may have a high density (i.e. less total free space and less permeability in its volume) and a second zone, in communication with the first zone but spaced from contact with the article, may have a lower density (i.e. greater free space than the first zone and greater permeability in its volume). Each zone has a generally continuous porosity through its volume. A third and subsequent zones may be in communication with the at least two porous zones. Furthermore, the invention is embodied by the first porous area located in contact with the article during moulding, and the second porous area distant from the first porous area, where the porosity changes over the volume of the mould. In other words, the mould defines a transitional volume between a first and second porosity.

In one form the invention is embodied by a mould for forming a bottle-shaped article from a fibre suspension, the mould comprising: a cavity in a negative shape of the bottle-shaped article to be formed; wherein the mould is configured to communicate a suspending fluid of the fibre suspension through at least two regions of different porosity about the cavity; wherein a first porous region, having a porosity less than or equal to 90% (or preferably less than or equal to 70%), is a first layer comprising the substantive article facing surface of the cavity, and a second porous region, having a porosity greater than the first porous region, is a second layer serving as a supporting structure for the first porous region. In a particular form the mould is a 3D printed (or other form of additive manufacturing) removeable insert, that may be block-shaped, for insertion into a mould block.

"Continuous porosity" in the context of the invention refers to a volume/surface area of consistent and evenly distributed pore structure, as distinct from a surface that has a relatively low number of intermittent "pores" or channels through the mould from an inlet side/article forming surface to an outlet side of the mould, e.g. of the type known from prior art EP1081285A1. Porosity between zones may be continuous in the sense that it gradually transitions from one density to another or may abruptly change at the boundary thereof.

The invention may be alternatively or additionally described in terms of permeability and/or an overall pressure drop through the mould. In other words, the invention is concerned with a "variable permeable mould" which is designed with flow characteristics therethrough in mind and, for example, in combination with a particular concentration of slurry.

A practical unit for permeability is the darcy (d), or more commonly the millidarcy (md).

A particular advantage of the moulding method is to allow multiple brand design options and surface features. By contrast, a conventional square carton can only be decorated by changing ink colour.

A method associated with the invention includes preparing a fibre suspension in a suspending liquid. Preparation may involve a pulp property refiner such as a valley beater and a tank for hydrating with a shear or paddle mixer. This step may be done continuously with the process or in batches. A concentrated form of the suspension may be prepared for dilution just prior to moulding. The concentration most effective for delivery to the mould is expected to be less than 1%, e.g. approximately 0.7% fibre.

While continuously fed to a two (or more)-part porous mould according to the invention (e.g. configured with a negative 3D image of the desired moulded article, such as a bottle) to a predetermined volume, the suspending liquid is removed via pores of the porous mould, e.g. by vacuum pressure/pump, differential or positive pressure. The predetermined volume may be monitored by weighing suspending liquid removed from the mould. By way of example, 10-50 Litres of process water may have been collected in a tank outside the porous mould, leaving behind the pulp fibres on the mould surface.

After substantially all suspending liquid is removed, a pressurising means, e.g. an impermeable surface (such as an inflatable bladder in a collapsed state) may be applied to the moulded article to impart pressure to internal walls of the article (e.g. by inflation with pneumatic or hydraulic pressure; air, water or oil) and thereby expel further suspending liquid through pores of the porous mould. The moulded article is removed for drying.

The walls of the porous/permeable mould are preferably cleaned after removal of the article, e.g. by reversing expelled suspending liquid back through the mould and/or use of a water jet against walls of the mould. Cleaning removes residual fibres from the porous surface and re-conditions the mould for repeated use. Particularly, permeability of the mould is restored, which is otherwise compromised after use.

A drying stage of the method/system may utilise micro-wave energy, e.g. in a continuous or batch delivery system. The article may be dried at a stage either before or after the non-porous mould, or both.

A coating stage may apply a protective layer to a surface of the moulded article. For example, the coating step may comprise spraying a base and sides of the moulded article internally and/or externally.

A closure element may be applied to an opening of the moulded article after coating/drying. The closure element may include a neck fitment with an annular feature to seal against the opening.

The invention may be embodied by a system for forming a moulded article, comprising: a source of fibre suspension in a suspending liquid; a delivery line to deliver the fibre suspension to a porous mould according to the invention; a suction pump for removing the suspending liquid via pores of the porous mould; a pressurising means (e.g. an inflatable pressing member configured to be inserted into the mould in a collapsed state and then inflated) to apply pressure to internal walls of the article.

The mould system devised to utilise the invention is particularly beneficial because a 3D printing process (in plastics) can be utilised to fabricate the mould's porous insert. In this way, rapid prototyping and development for process improvements can be achieved. The mould can also be made using other processes, e.g. other additive manufacturing techniques.

DETAILED DESCRIPTION OF THE INVENTION

The following description presents an exemplary embodiment and, together with the drawings, serves to explain principles of the invention. However, the scope of the invention is not intended to be limited to the precise details of the embodiments or exact adherence with all features and steps, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "upper" and "lower" are used for convenience of explanation usually with reference to the illustrations and are not intended to be ultimately limiting if an equivalent function can be achieved with an alternative dimension and/or direction.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

Figure 1:
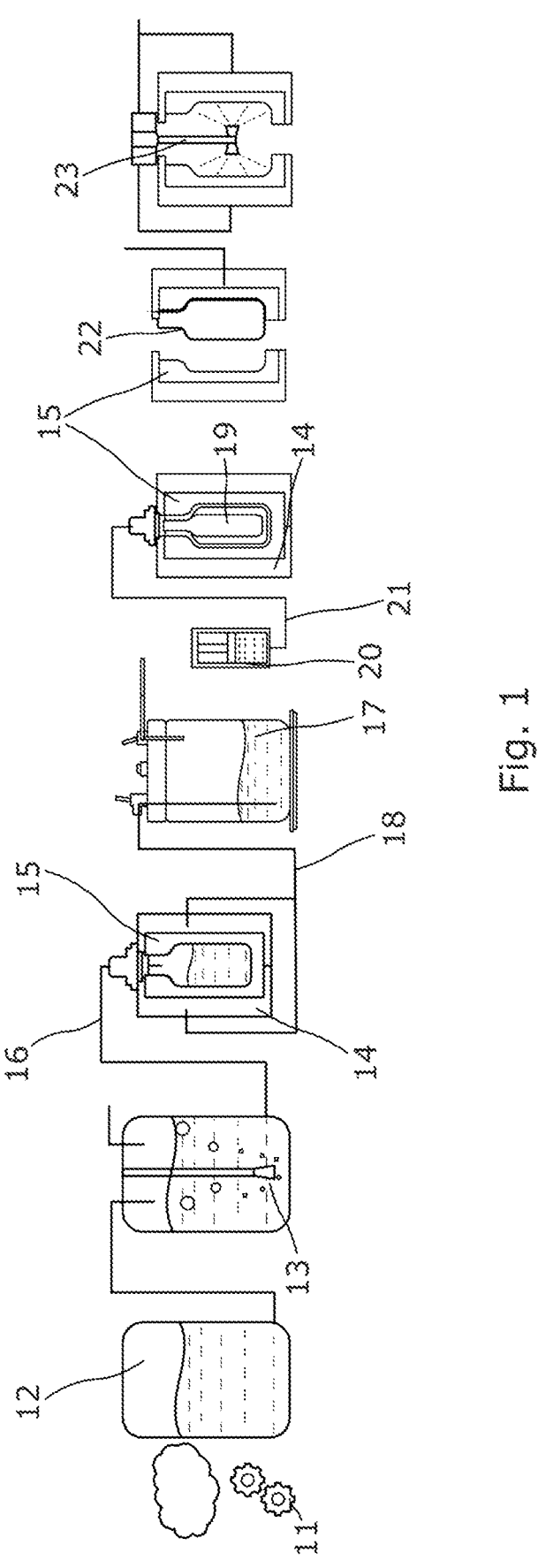
FIG. 1 illustrates a process implementing a mould according to the invention.

For understanding the context and use of a mould according to the invention, FIG. 1 outlines one example of a process for producing a pulp article, e.g. a bottle. The process comprises the steps of preparing a pulp suspension, introducing this to a porous mould, and expelling a suspending liquid therefrom.

At a first stage of pulp processing and storage, raw pulp fibres are rehydrated and passed between plates of a valley beater 11. This process encourages fibrillation, i.e. the partial delamination of the cell wall, resulting in a hairy appearance of the wetted fibre surfaces. The resultant "hairs", also called fibrillations, increase the relative strength of the bond between fibres in the dry product.

During this process desired additives are used to change the structure, strength and moulding properties of the bottle and potentially reduce cost. Sizing, fillers and buffer additives can be evaluated as required.

A concentrated form of the processed pulp can be stored in a vat 12 until required, which reduces the total amount of storage space.

Dilution, e.g. 0.1 to 5%, less than 1%, most preferably 0.7%, solid fibre of a water-based suspension, is carried out at a mixing station 13 just prior to moulding. Mixing at this step ensures the slurry is homogenised without changing the characteristics of the pulp. As shown, bubbles rise to the top, displacing the slurry above them and pulling the bottom level liquids upwards.

The moulding step 14 features a tool 15 (e.g. 3D printed insert) where two or more cooperating pieces are clamped together using hydraulic rams to form a cavity in which the article will form. Slurry is top-filled into tool 15 (at an inlet tube described further below), which is in contrast to a moulding processes that submerges a mould in slurry. The pulp slurry is thereafter drawn via line 16 under a vacuum (or positive/differential pressure) through porous tool 15, similar to an injection moulding machine. Shot mass may be controlled by measuring (e.g. weighing) the mass/volume of water being drawn into the tank 17. Once the required mass is reached, the tool is opened to ambient air. A weight scale platform supporting tank 17 is visible in FIG. 1.

The suspending liquid drawn with the fibre suspension in line 16 is water. Water drawn under vacuum through line 18 into tank 17 is substantially free of fibres since these are left behind against the walls of porous tool 15. By way of example, suction of suspending liquid 18 through mould 15 is continuous until a predetermined volume (e.g. 10 litres) of water has been collected in tank 17.

The "article" within tool 15 is, at this stage, a formed but wet shape held against the internal walls of the mould.

In order to remove further suspending liquid (water) and consolidate the 3D article shape a pressurising means is activated. In the illustrated embodiment a collapsible bladder 19 is inserted into mould 15 to act as an internal high-pressure core structure for the tool. As mentioned, this process strengthens the wet 'embryo' bottle so that it can be handled (or transported by mechanised means) before drying and displaces water in-between the cellulose fibres, thereby increasing the efficiency of the drying process. The bladder 19 is actuated using a hydraulic pump 20 with a cylinder that displaces a fluid in line 21 into bladder 19 to expand it and conform to the tool cavity. Fluid within line 21 is preferably non-compressible such as water. Use of water also has the advantage that any leaking or bursting of the bladder will not introduce a new substance to the system (since the suspending liquid is already water). Any bladder failures can be quickly cleaned up.

Figure 2:
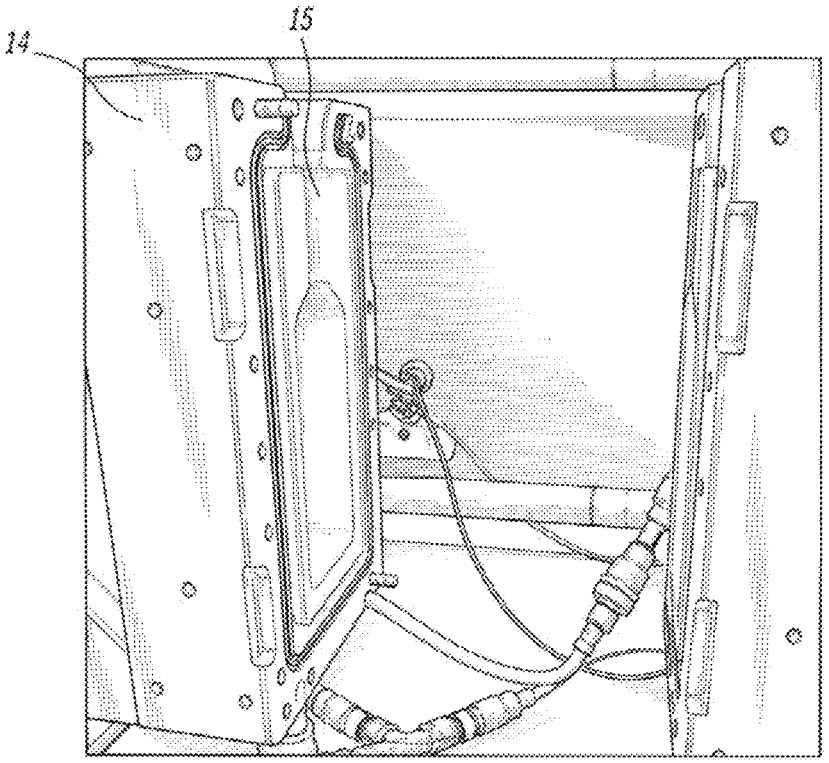
FIG. 2 illustrates a 3D porous mould according to the invention.
Figure 3:
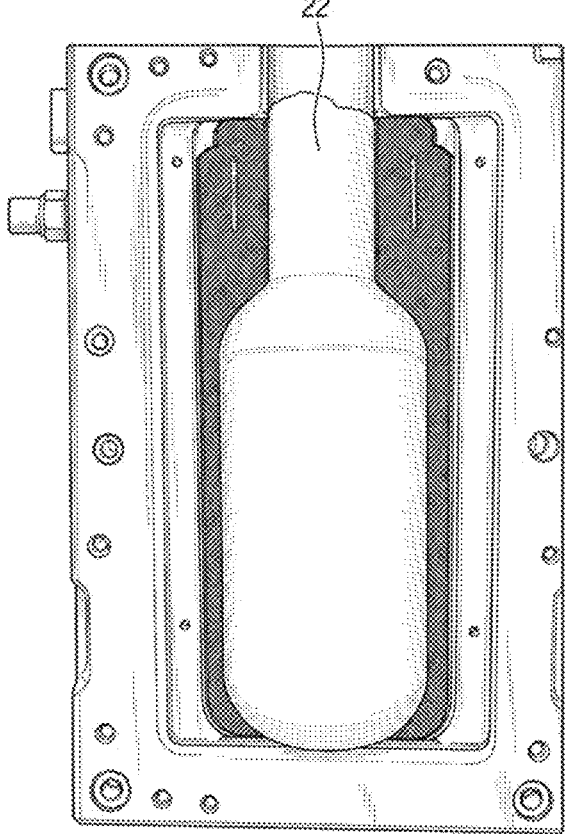
FIG. 3 illustrates a moulded article as it is removed from the 3D porous mould.

FIGS. 2 and 3 show, pictorially, the appearance of a two-part mould block 14 that houses a porous mould 15 insert according to the invention. Channels through block 14 communicate with a rear side of the porous mould 15 to provide a path for suspending liquid drawn through the mould via line 18 (as seen in FIG. 1), and also reverse flow during the cleaning step (described below).

Demoulding occurs at the step (and shown in FIG. 3) where mould tool 15 opens for removal of a self-supporting article 22. A cleaning step 23 is performed to remove small fibres and maintain tool porosity/permeability. In the illustrated form, a high-pressure jet firing radially is inserted into the moulding chamber while the tool is open. This dislodges fibres on the surface. Alternatively, or in addition, water from tank 17 (as seen in FIG. 1) is pressurised through line 18 (as per FIG. 1) to the back of the tool 15 to dislodge entrapped fibres. Water may be drained for recycling back to an upstream step of the system. It is noteworthy that cleaning is an important step for conditioning the tool for re-use. The tool may appear visibly clean after removal of the article, but its performance will be compromised without a cleaning step.

The self-supporting article 22 may be transported for further processing, drying etc, but such details are outside the scope of the present disclosure.

Figure 4:
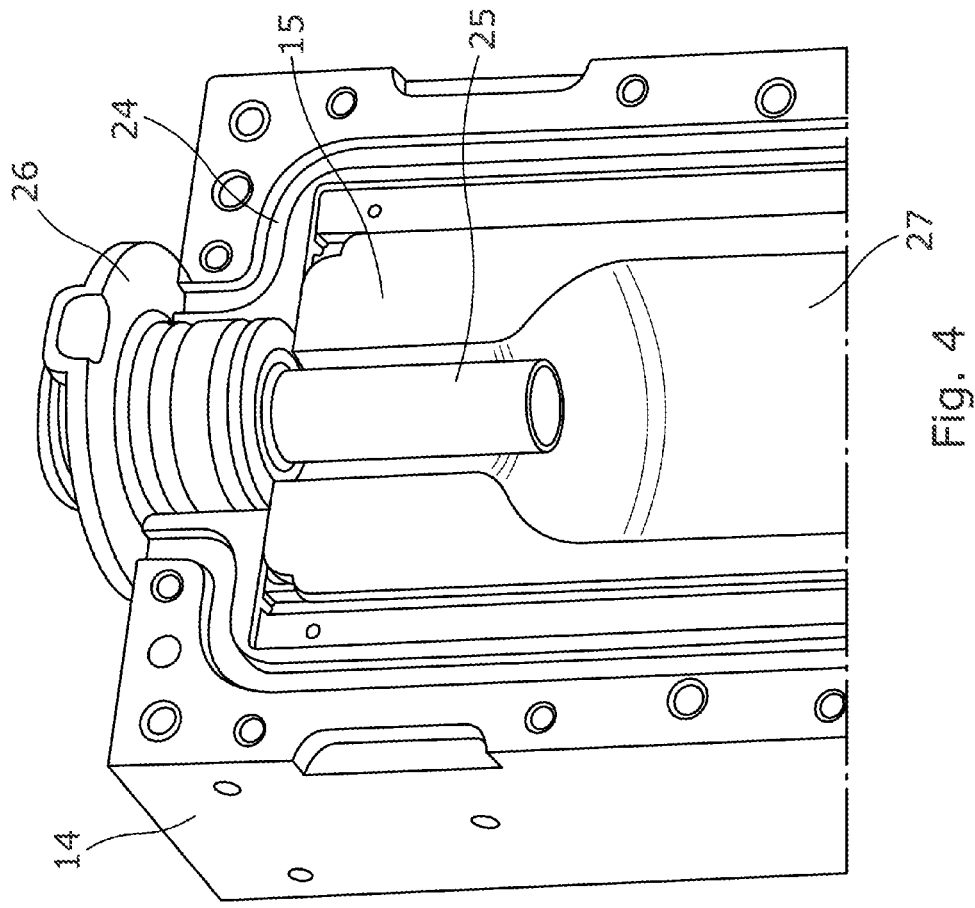
FIG. 4 illustrates a general view of the mould and a pulp dispensing nozzle.

FIG. 4 illustrates an upper portion of mould casing 14 and porous tool 15. It will be apparent that casing 14 includes a channel 24 for accommodating a seal and a fill tube 25 extends from a tool plug 26 to close off an opening into tool 15. The length of tube 25 is sufficient to extend into the substantive open volume of mould cavity 27, i.e. proximate a shoulder area of the article.

Tube 25 overcomes issues with regard to deposition of pulp material around the neck; e.g. without this fill tube, the pulp neck may be ill-formed as it can wash away by incoming suspension. It will be apparent that tube 25 provides a hard external surface against which pulp can pack and form a neck region of the formed article. An internal surface of the bottle neck is pressed against the external surface of tube 25.

Figure 5:
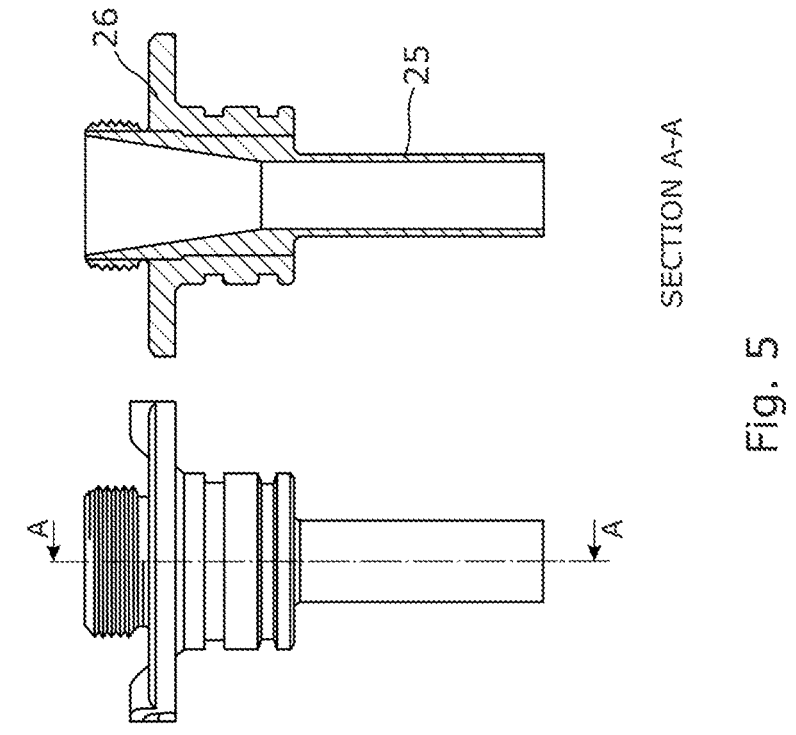
FIG. 5 illustrates a side and section elevation view of the pulp nozzle of FIG. 4.

FIG. 5 shows internal detail of plug 26 and tube 25, which may include a thread for coupling to the fibre suspension delivery line 16.

Figure 6:
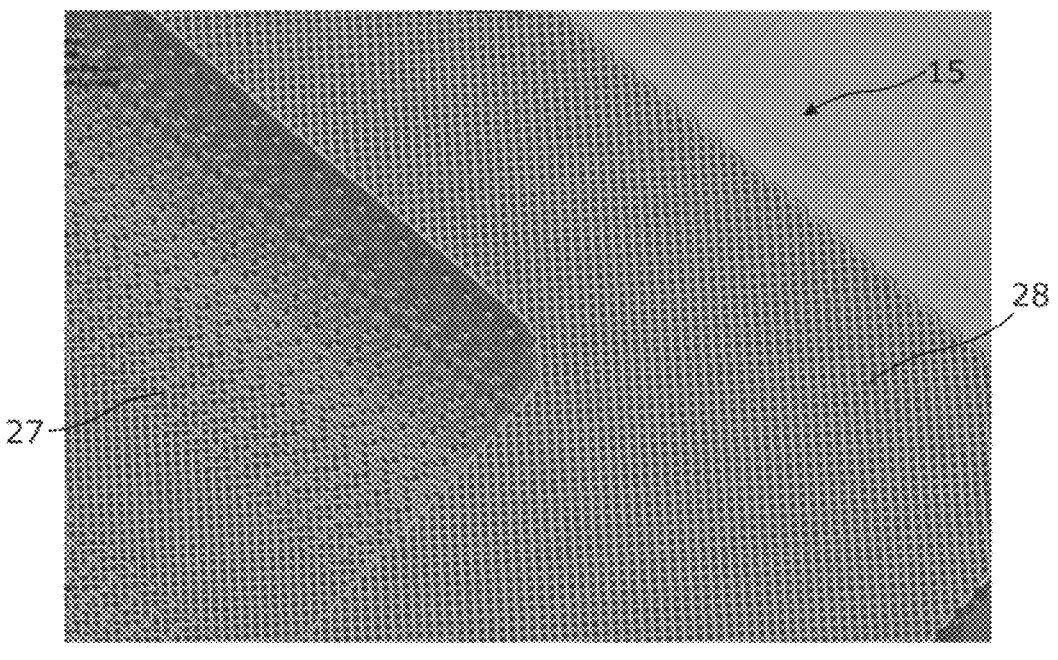
FIG. 6 illustrates a close up view of a mould surface.

The surface structure of a tool 15, e.g. made by additive manufacturing, is illustrated by FIG. 6. The image shows application of a 3D printer software 'slicer' that creates holes in the tooling. The porous surface is comprised of a criss-cross structure resembling a relatively consistent mesh. The tool 15 includes a cut-away cavity 27 which provides a negative image against which the article walls take their shape. Porosity and permeability should be generally consistent across the cavity.

The interior surface 28 of the mould tool 15 as shown, i.e. the surface in direct contact with the forming article has, according to the present embodiment, a relatively high density of pores.

This high detail layer 28 serves as a first zone of tool 15 and, in the illustrated example, is 5 mm thick around the entire outer body of the bottle.

Figure 7:
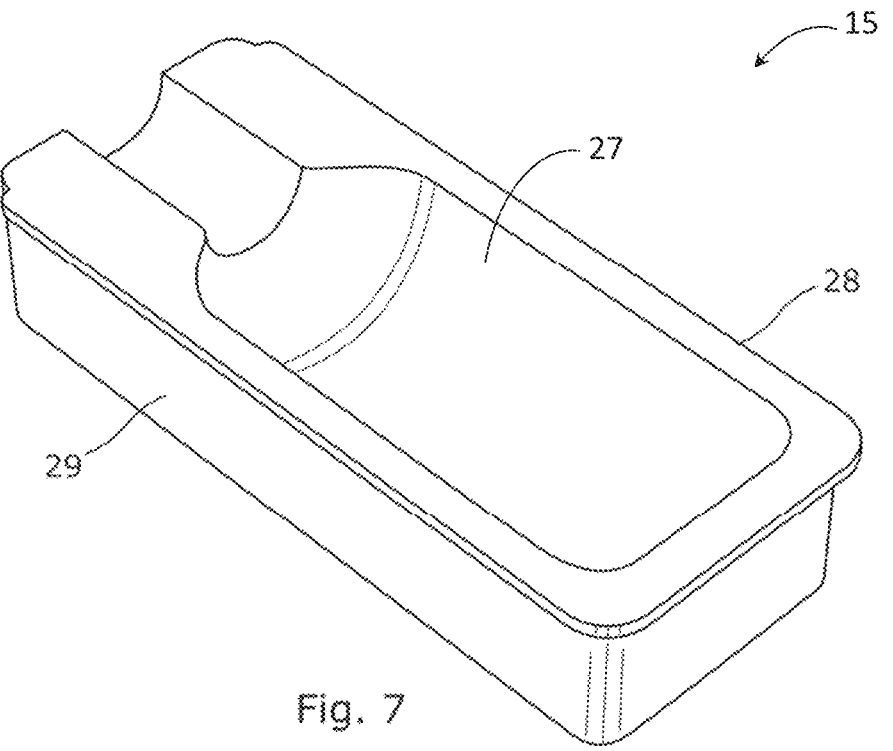
FIG. 7 illustrates a perspective view of the mould.

FIG. 7 zooms out from the image of FIG. 6 to show a second zone 29 that surrounds the first zone 28. The second zone 29 is a lower pore density support layer that prevents the structure immediately in contact with the article from breaking due to bladder inflation (19) (FIG. 1).

The first/inner layer 28 is typically 40%-70% porous and the second/outer layer 29 has a typical porosity of 80-90% so that suspension liquid can be quickly pumped out of the mould from the fibre deposited against cavity 27.

The illustrated embodiment is preferred in order to achieve desirable results in the moulded article. However, the principles of providing an additive manufactured mould (insert 14) with different zones of porosity can be adapted. For example, a mixture of high- and low-density areas may be in contact with the article during moulding to give different surface effects. Three or more zones may be found to optimise the process in some future embodiments. Furthermore, assuming good control over 3D printing, the porosity may transition from a first porosity at the cavity/inlet surface to a second porosity at the outlet surface.

Figure 8:
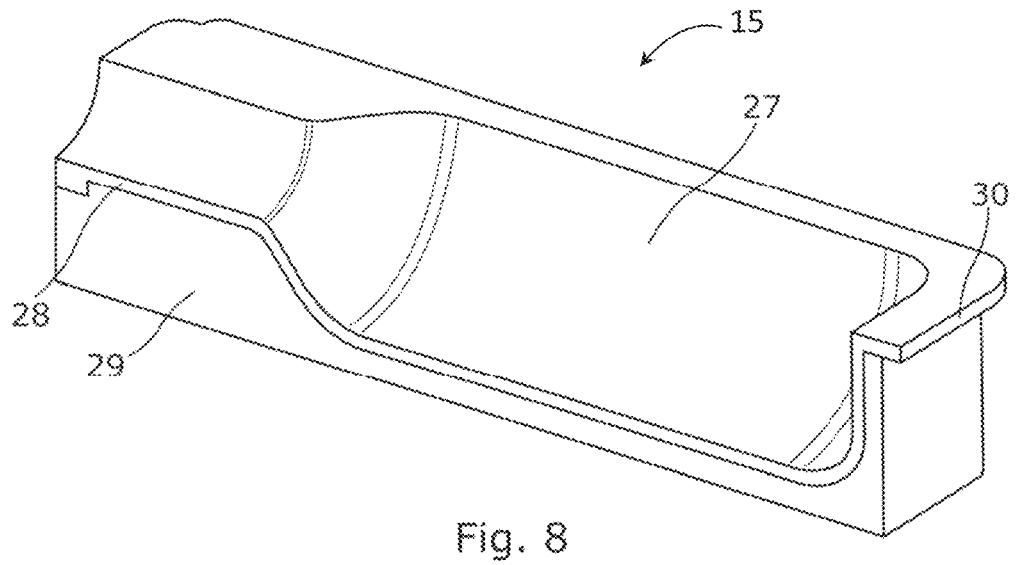
FIG. 8 illustrates a perspective section view of the mould from FIG. 7.

FIG. 8 is a cross section view of the half-mould shown in FIG. 7. The high-density zone 28 is clearly seen as a layer against second zone 29 that forms the substantive volume of tool insert 15. Layer 28 includes a lip 30 that forms a flange at edges where two halves of tool 15 meet. However, alternative configurations are possible such as where layer 28 is contained wholly within cavity 27. Furthermore, there may be multiple cavities within a mould half to produce more than one bottle simultaneously from the same mould tool.

Figure 9:
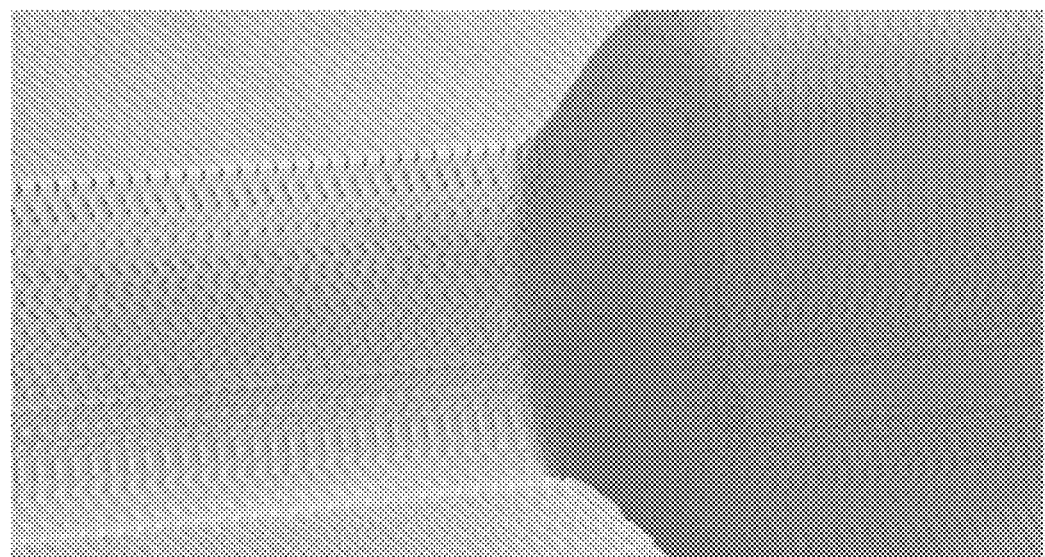
FIG. 9 illustrates a view of surface features of the mould.

FIG. 9 shows, in greater detail, a 3D printed textured porous surface of a bottle neck.

Tool 15 may include a neck insert associated with a closure of the moulded article. For example, a ring structure may be separately formed from pulp fibre by a compression moulding process and inserted into the mould to serve as a finishing step for the mouth of a bottle 22, preferably providing a flat surface 39 onto which a heat-sealed film can be applied. However, such options are not illustrated.

In summary, the invention can generally be considered a mould (14) for forming an article from a fibre suspension. The mould includes an porous insert with a cavity (27) in the negative shape of an article to be formed and two regions of different porosity (28, 29) about the cavity (27). In use the mould communicates a suspending fluid of the fibre suspension, e.g. by vacuum pump, through the at least two regions of different porosity about the cavity leaving behind a formed shape on the cavity.

The invention claimed is:

1. A mould for forming a bottle shaped article from a fibre suspension, the mould comprising:
   a cavity in a negative shape of the bottle shaped article to be formed;
   wherein the mould is configured to communicate a suspending fluid of the fibre suspension through at least two volumetric regions of different porosity about the cavity;
   wherein a first porous region, having a porosity greater than 0% and less than or equal to 90%, is a first layer comprising a criss-cross structure of a consistent mesh and constitutes the substantive article facing surface of the cavity, and a second porous region, having a porosity greater than the first porous region but less than 100%, is a second layer serving as a supporting structure for the first porous region, the first porous region and the second porous region being configured to cause an overall pressure drop through the mould;
   wherein porosity denotes the ratio of void volume to total volume of the first porous region and the second porous region.

2. The mould of claim 1, comprising a third porous region in communication with the first and second porous region.

3. The mould of claim 1, wherein the mould is a removeable insert for insertion into a mould block.

4. The mould of claim 3, wherein the removeable insert is 3-D printed or made by another additive manufacturing technique.

5. The mould of claim 1, wherein the porosity of the first porous region is 40%-70% and the porosity of the second porous region is 80-90%.

6. The mould of claim 1, wherein the mould comprises two or more cooperating pieces, each including a portion of the cavity, configured to open apart for removal of a moulded article.

7. The mould of claim 1, comprising an opening into the cavity for receiving a fibre suspension dispenser nozzle.

8. The mould of claim 7, in combination with a fibre suspension dispenser nozzle, wherein the cavity is configured for moulding a bottle comprising a neck, shoulder and main body; the fibre suspension dispenser nozzle comprising a tube extendable through the opening, to a position proximate the shoulder.

9. A method of moulding an article, comprising:
   preparing a fibre suspension in a suspending liquid;
   feeding the fibre suspension to the mould according to claim 1;
   removing the suspending liquid through the at least two regions of different porosity;
   applying pressure to internal walls of the article, in order to expel further suspending liquid through the at least two regions of different porosity; and
   removing the moulded article from the mould.

10. The method of claim 9, comprising cleaning walls of the mould after removal of the article.

11. The method of claim 10, wherein cleaning comprises reversing expelled suspending liquid back through the mould and/or use of a water jet against walls of the mould.

12. The method of claim 9, wherein the fibre suspension fed to the porous mould comprises 0.1 to 1% solids.

13. The method of claim 12 wherein the fiber suspension fed to the porous mould comprises 0.7% solids.

* * * * *